(12) United States Patent
Iwata (10) Patent No.: US 11,192,404 B2
(45) Date of Patent: Dec. 7, 2021

(54) TYRE

(71) Applicant: SUMITOMO RUBBER INDUSTRIES, LTD., Kobe (JP)

(72) Inventor: Yasutaka Iwata, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 325 days.

(21) Appl. No.: 16/279,750

(22) Filed: Feb. 19, 2019

(65) Prior Publication Data

US 2019/0283506 A1    Sep. 19, 2019

(30) Foreign Application Priority Data

Mar. 13, 2018    (JP) .............................. JP2018-045863

(51) Int. Cl.
    *B60C 11/12*    (2006.01)
    *B60C 11/13*    (2006.01)
    *B60C 11/03*    (2006.01)
    *B60C 5/00*     (2006.01)

(52) U.S. Cl.
    CPC .......... *B60C 11/12* (2013.01); *B60C 11/0306* (2013.01); *B60C 11/1204* (2013.01); *B60C 11/1236* (2013.01); *B60C 11/1376* (2013.01); *B60C 5/00* (2013.01); *B60C 2011/0346* (2013.01); *B60C 2011/0358* (2013.01);
    (Continued)

(58) Field of Classification Search
    None
    See application file for complete search history.

(56) References Cited

U.S. PATENT DOCUMENTS

| 6,250,354 B1 | 6/2001 | Kawai |
| 2012/0305155 A1 | 12/2012 | Hamanaka |

(Continued)

FOREIGN PATENT DOCUMENTS

| CN | 104228469 A | 12/2014 |
| DE | 102012209246 A1 | 12/2012 |

(Continued)

OTHER PUBLICATIONS

Extended European Search Report for European Application No. 19158013.3, dated Jul. 29, 2019.

*Primary Examiner* — Alison L Hindenlang
*Assistant Examiner* — Olukorede Esan
(74) *Attorney, Agent, or Firm* — Birch, Stewart, Kolasch & Birch, LLP (57) ABSTRACT

A tyre comprises a tread portion. The tread portion includes a shoulder main groove extending continuously in a zigzag manner in a tyre circumferential direction on a side of a tread edge, a plurality of middle lateral grooves each extending inwardly in a tyre axial direction from the shoulder main groove, and a plurality of middle blocks divided by the plurality of the middle lateral grooves. Each of the middle blocks has a ground contacting surface defined between a first edge and a second edge extending in the tyre circumferential direction. At least one of the middle blocks has a full sipe extending so as to connect between the first edge and the second edge and having at least one bent portion, and a semi-sipe extending linearly from the first edge or the second edge and terminating within the at least one of the middle blocks.

20 Claims, 7 Drawing Sheets

(52) U.S. Cl.
  CPC ............... *B60C 2011/0381* (2013.01); *B60C 2011/0383* (2013.01)

(56) References Cited

U.S. PATENT DOCUMENTS

| | | | |
|---|---|---|---|
| 2013/0000805 A1* | 1/2013 | Oodaira | ............... B60C 11/11 152/209.18 |
| 2013/0105052 A1* | 5/2013 | Tanaka | ............... B60C 11/032 152/209.17 |
| 2013/0146192 A1* | 6/2013 | Miyoshi | ............. B60C 11/0302 152/209.25 |
| 2016/0152091 A1* | 6/2016 | Yoshida | ............. B60C 11/0332 152/209.18 |
| 2016/0297255 A1* | 10/2016 | Wakizono | ........... B60C 11/0327 |

FOREIGN PATENT DOCUMENTS

| | | |
|---|---|---|
| EP | 3081393 A1 | 10/2016 |
| EP | 3081397 A1 | 10/2016 |
| JP | 2007-302071 A | 11/2007 |
| JP | 2016-64781 A | 4/2016 |
| WO | WO 2015/190206 A1 | 12/2015 |

\* cited by examiner

TYRE

TECHNICAL FIELD

The present invention relates to a tyre suitable for running on an icy/snowy road surface.

BACKGROUND ART

Japanese Unexamined Patent Publication No. 2016-064781 (Patent Literature 1) has proposed a tyre having blocks divided in a region on an inner side in a tyre axial direction between a pair of shoulder main grooves each extending in a zigzag manner.

SUMMARY OF THE INVENTION

The blocks disclosed in the Patent Literature 1 are provided with sipes in order to improve on-ice/on-snow performance. However, the sipes decrease rigidity of the blocks, therefore, uneven wear such as heel and toe wear and the like tends to occur.

The present invention was made in view of the above, and a primary object thereof is to provide a tyre capable of improving the on-ice/on-snow performance while suppressing the uneven wear.

In one aspect of the present invention, a tyre comprises a tread portion comprising a shoulder main groove extending continuously in a zigzag manner in a tyre circumferential direction on a side of a tread edge, a plurality of middle lateral grooves each extending inwardly in a tyre axial direction from the shoulder main groove, and a plurality of middle blocks divided by the plurality of the middle lateral grooves, wherein each of the middle blocks has a ground contacting surface defined between a first edge thereof extending in the tyre circumferential direction and a second edge thereof extending in the tyre circumferential direction, at least one of the middle blocks has a full sipe and at least one semi-sipe, the full sipe extends so as to connect between the first edge and the second edge and has at least one bent portion, and the semi-sipe extends linearly from the first edge or the second edge and terminates within the at least one of the middle blocks.

In another aspect of the invention, it is preferred that the at least one of the middle blocks has two semi-sipes.

In another aspect of the invention, it is preferred that the two semi-sipes include a first semi-sipe extending from the first edge and a second semi-sipe extending from the second edge.

In another aspect of the invention, it is preferred that the tread portion has a crown main groove extending in the tyre circumferential direction on a side of a tyre equator of the shoulder main groove, the crown main groove has longitudinal groove portions and lateral groove portions arranged alternately in the tyre circumferential direction so that the crown main groove extends in a zigzag manner, the longitudinal groove portions extend obliquely in the tyre circumferential direction, and the lateral groove portions extend in the tyre axial direction.

In another aspect of the invention, it is preferred that the middle lateral grooves include a first middle lateral groove and a second middle lateral groove, the first middle lateral groove is connected with one of the longitudinal groove portions, and the second middle lateral groove is connected with at least a part of one of the lateral groove portions.

In another aspect of the invention, it is preferred that the first middle lateral groove is bent in a direction so as to be convex toward one side in the tyre circumferential direction.

In another aspect of the invention, it is preferred that the first middle lateral groove includes a part extending along the full sipe.

In another aspect of the invention, it is preferred that the second middle lateral groove includes a main body portion and a branch portion, the main body portion extends so as to connect between the shoulder main groove and the crown main groove, and the branch portion branches from the main body portion and extends therefrom.

In another aspect of the invention, it is preferred that the main body portion includes a first portion and a second portion, the first portion extends from the shoulder main groove at a constant groove width, and the second portion is connected with the first portion and has a groove width gradually increasing as it goes toward the crown main groove.

In another aspect of the invention, it is preferred that the first middle lateral groove is bent in a direction so as to be convex toward one side in the tyre circumferential direction, and the first portion and the second portion are connected with each other such that a connection portion between them is bent so as to be convex toward the other side in the tyre circumferential direction.

In another aspect of the invention, it is preferred that the branch portion terminates within one of the middle blocks adjacent thereto.

In another aspect of the invention, it is preferred that the branch portion has an edge extending linearly and continuously with a part of an edge of the main body portion.

The tread portion of the tyre according to the present invention includes the shoulder main groove extending continuously in a zigzag manner in the tyre circumferential direction on the side of the tread edge, a plurality of the middle lateral grooves each extending inwardly in the tyre axial direction from the shoulder main groove, and a plurality of the middle blocks divided by the plurality of the middle lateral grooves. The middle blocks shear snow and ice fragments compressed in the shoulder main groove and the middle lateral grooves during running on an icy/snowy road surface, therefore, large traction is exerted.

DESCRIPTION OF THE PREFERRED EMBODIMENT

An embodiment of the present invention will now be described in conjunction with accompanying drawings.

Figure 1:
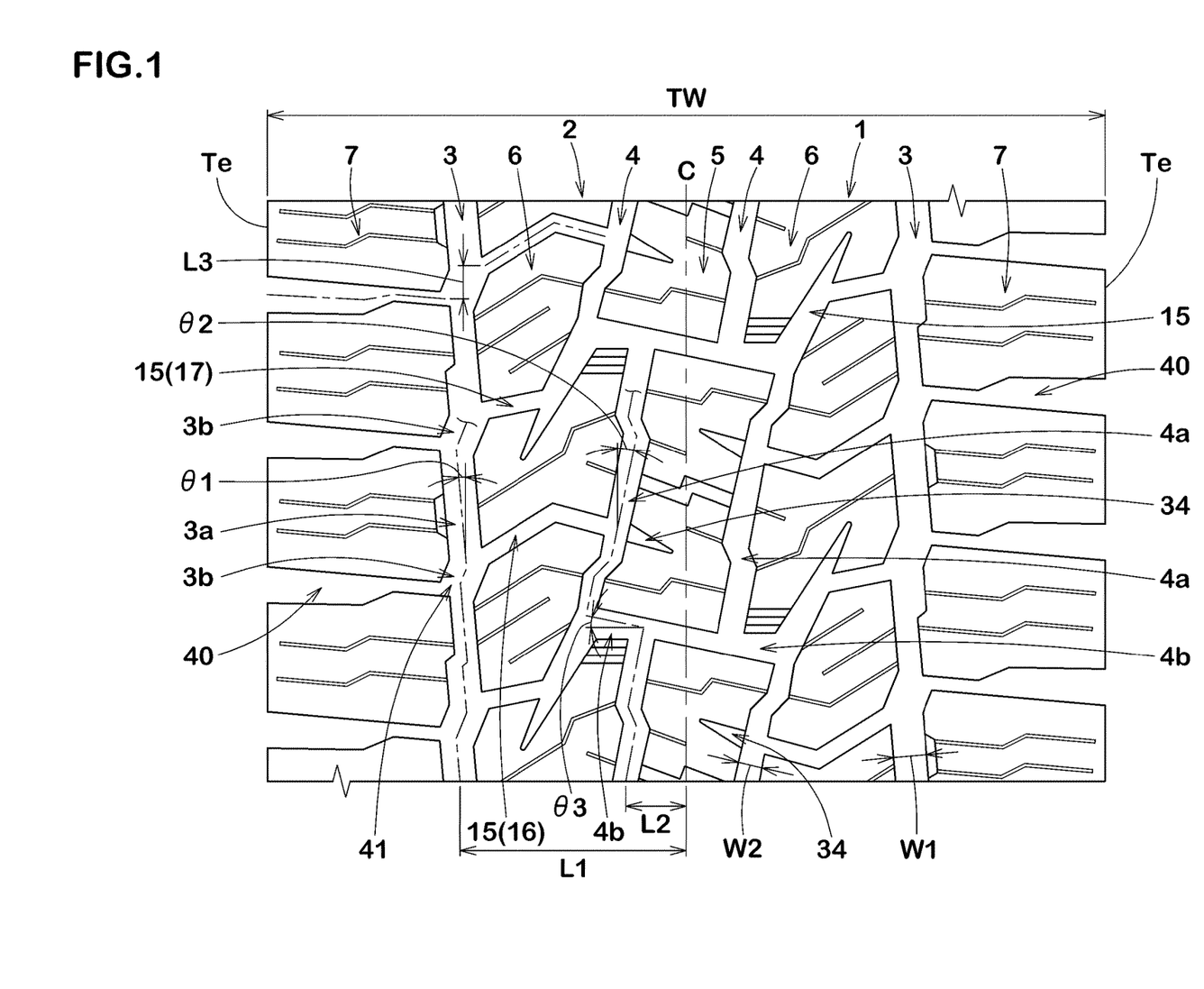
FIG. 1 is a development view of a tread portion of a tyre as an embodiment of the present invention.

FIG. 1 is a development view of a tread portion 2 of a tyre 1 according to an embodiment of the present invention. The tyre 1 in this embodiment is suitably used as a pneumatic tyre for a passenger car and suitably used for an SUV (sport utility vehicle) suitable for running on an icy/snowy road surface and for running on rough terrain, for example. However, the tyre 1 of the present invention is not limited to such an embodiment.

As shown in FIG. 1, the tyre 1 in this embodiment has the tread portion 2 whose position when mounted on a vehicle is not specified, for example. In a preferred embodiment, the tread portion 2 has a point symmetric tread pattern, for example.

The tread portion 2 is provided with a plurality of main grooves each extending continuously in a tyre circumferential direction. The plurality of the main grooves includes shoulder main grooves 3 each arranged on a side of a respective one of tread edges (Te), crown main grooves 4 each arranged on a side of a tyre equator (C) of a respective one of the shoulder main grooves 3, for example. The tread portion 2 in this embodiment is provided with two shoulder main grooves 3 and two crown main grooves 4 with the tyre equator (C) therebetween. In another embodiment, only one crown main groove 4 may be provided on the tyre equator (C).

In a case of a pneumatic tyre, the tread edges (Te) are defined as outermost ground contacting positions in a tyre axial direction of the tyre 1 when the tyre 1 in a standard state is in contact with a flat surface with zero camber angle by being loaded with a standard tyre load. The standard state is a state in which the tyre is mounted on a standard rim, inflated to a standard tyre inner pressure, and loaded with no tyre load. In this specification, unless otherwise noted, dimensions and the like of various parts of the tyre are values measured in the standard state.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard tyre inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the shoulder main grooves 3 extends in a zigzag manner. Each of the shoulder main grooves 3 in this embodiment includes first inclined portions (3a) and second inclined portions (3b) arranged alternately in the tyre circumferential direction, for example. The second inclined portions (3b) are inclined in an opposite direction to the first inclined portions (3a), for example. Each of the first inclined portions (3a) and the second inclined portions (3b) is inclined at an angle $\theta 1$ in a range of from 50 to 25 degrees with respect to the tyre circumferential direction, for example. Each of the second inclined portions (3b) in this embodiment is inclined at a larger angle than that of each of the first inclined portions (3a) with respect to the tyre circumferential direction. It is preferred that each of the second inclined portions (3b) has a larger groove width than that of each of the first inclined portions, for example.

It is preferred that each of the crown main grooves 4 extends in a zigzag manner, for example. Each of the crown main grooves 4 in this embodiment has longitudinal groove portions (4a) and lateral groove portions (4b) arranged alternately in the tyre circumferential direction. The longitudinal groove portions (4a) extend obliquely in the tyre circumferential direction and the lateral groove portions (4b) extend in the tyre axial direction. It is preferred that each of the longitudinal groove portions (4a) is inclined at an angle $\theta 2$ in a range of from 5 to 15 degrees with respect to the tyre circumferential direction, for example. It is preferred that each of the lateral groove portions (4b) is inclined at an angle $\theta 3$ in a range of from 5 to 15 degrees with respect to the tyre axial direction, for example.

A distance L1 between the tyre equator (C) and a groove center line of each of the shoulder main grooves 3 is preferably in a range of from 0.20 to 0.35 times, more preferably in a range of from 0.25 to 0.30 times a tread width Tw, for example. It is preferred that a distance L2 between the tyre equator (C) and a groove center line of each of the crown main grooves 4 is in a range of from 0.05 to 0.10 times the tread width TW, for example. The tread width TW is a distance in the tyre axial direction between one of the tread edges (Te) and the other one of the tread edges (Te) of the tyre 1 in the standard state.

It is preferred that a groove width W1 of each of the shoulder main grooves 3 and a groove width W2 of each of the crown main grooves 4 are in a range of from 2.5% to 5.0% of the tread width TW, for example. It is possible that the main grooves configured as such improve the on-ice/on-snow performance and steering stability on a dry road surface in a good balance.

By the provision of the main grooves described above, the tread portion 2 is divided into a plurality of land regions. The tread portion 2 in this embodiment has a crown land region 5, middle land regions 6, and shoulder land regions 7. The crown land region 5 is defined between the two crown main grooves 4. Each of the middle land regions 6 is defined between one of the crown main grooves 4 and its adjacent one of the shoulder main grooves 3. Each of the shoulder land regions 7 is defined between one of the shoulder main grooves 3 and its adjacent one of the tread edges (Te). The tread portion 2 in this embodiment is divided into five land regions by two shoulder main grooves 3 and two crown main grooves 4. However, the present invention is not limited to such an embodiment, and the tread portion 2 may be divided into four land regions by two shoulder main grooves 3 and one crown main groove 4, for example.

Figure 2:
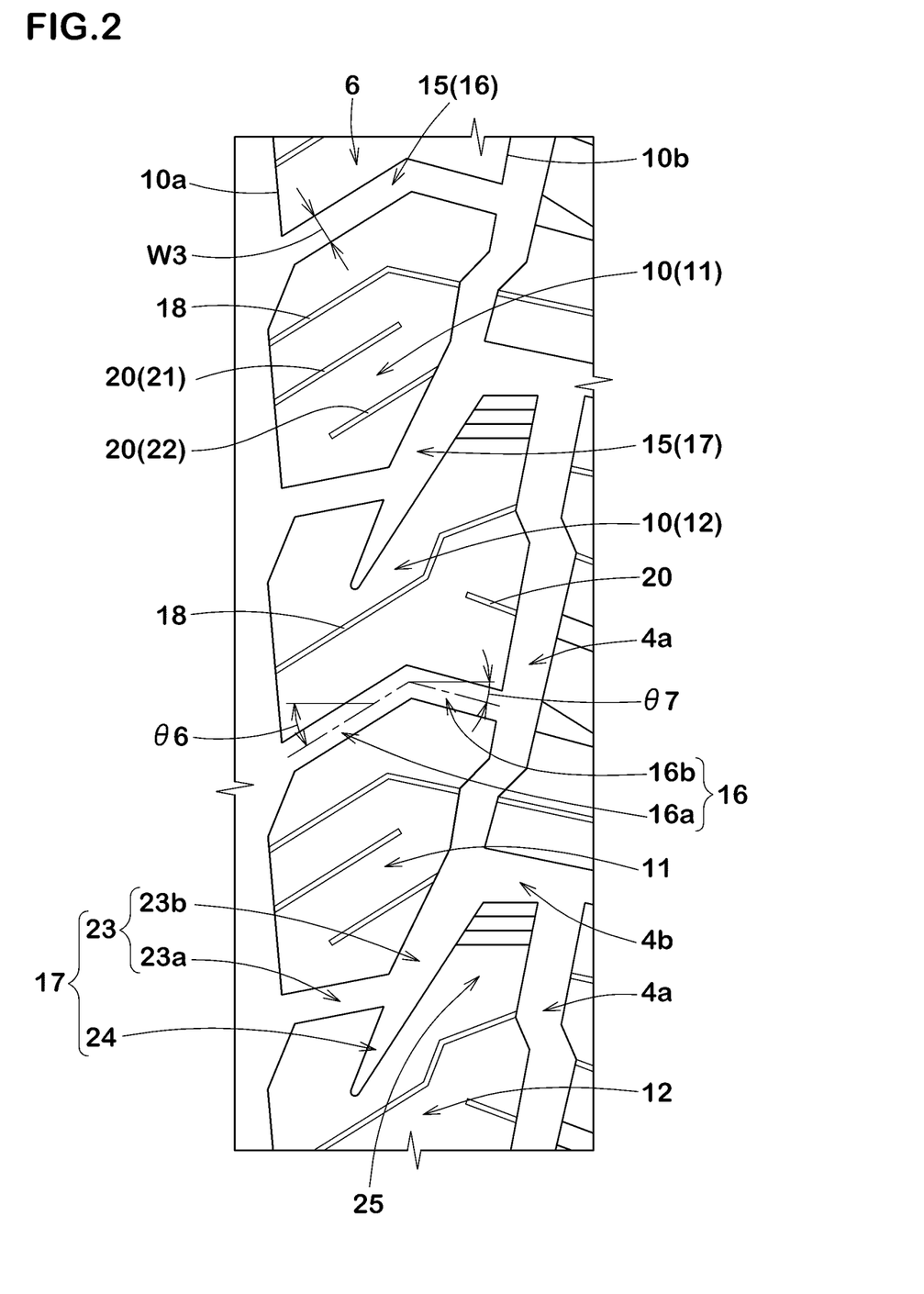
FIG. 2 is an enlarged view of a middle land region of FIG. 1.

FIG. 2 is an enlarged view of one of the middle land regions 6. As shown in FIG. 2, each of the middle land regions 6 includes a plurality of middle blocks 10. Each of the middle land regions 6 is divided into the middle blocks 10 by a plurality of middle lateral grooves 15 each extending axially inwardly.

Each of the middle blocks 10 has a ground contacting surface defined between a first edge (10a) thereof extending in the tyre circumferential direction and a second edge (10b) thereof extending in the tyre circumferential direction. At least one of the middle blocks 10 has a full sipe 18 and a semi-sipe 20. Note that, in this specification, the term "sipe" means an incision whose width is less than 1.5 mm.

The full sipe 18 extends between the first edge (10a) and the second edge (10b) and have at least one bent portion. The semi-sipe 20 extends linearly from the first edge (10a) or the second edge (10b) and terminates within a respective one of the middle blocks 10.

It is possible that each of the sipes increase frictional force on ice and snow by edges thereof. On the other hand, the full sipe 18 has at least one bent portion, therefore, it is possible that frictional force in multiple directions are provided and that shearing deformation of the middle blocks 10 in a longitudinal direction thereof is suppressed. Further, the semi-sipe 20 terminates within a respective one of the middle blocks 10, therefore, it is possible that rigidity of the respective one of the middle blocks 10 is maintained. Thereby, the tyre 1 of the present invention suppresses rigidity decrease of the middle blocks 10 due to the sipes, therefore, it is possible that the uneven wear of the middle blocks 10 is suppressed consequently.

Figure 3:
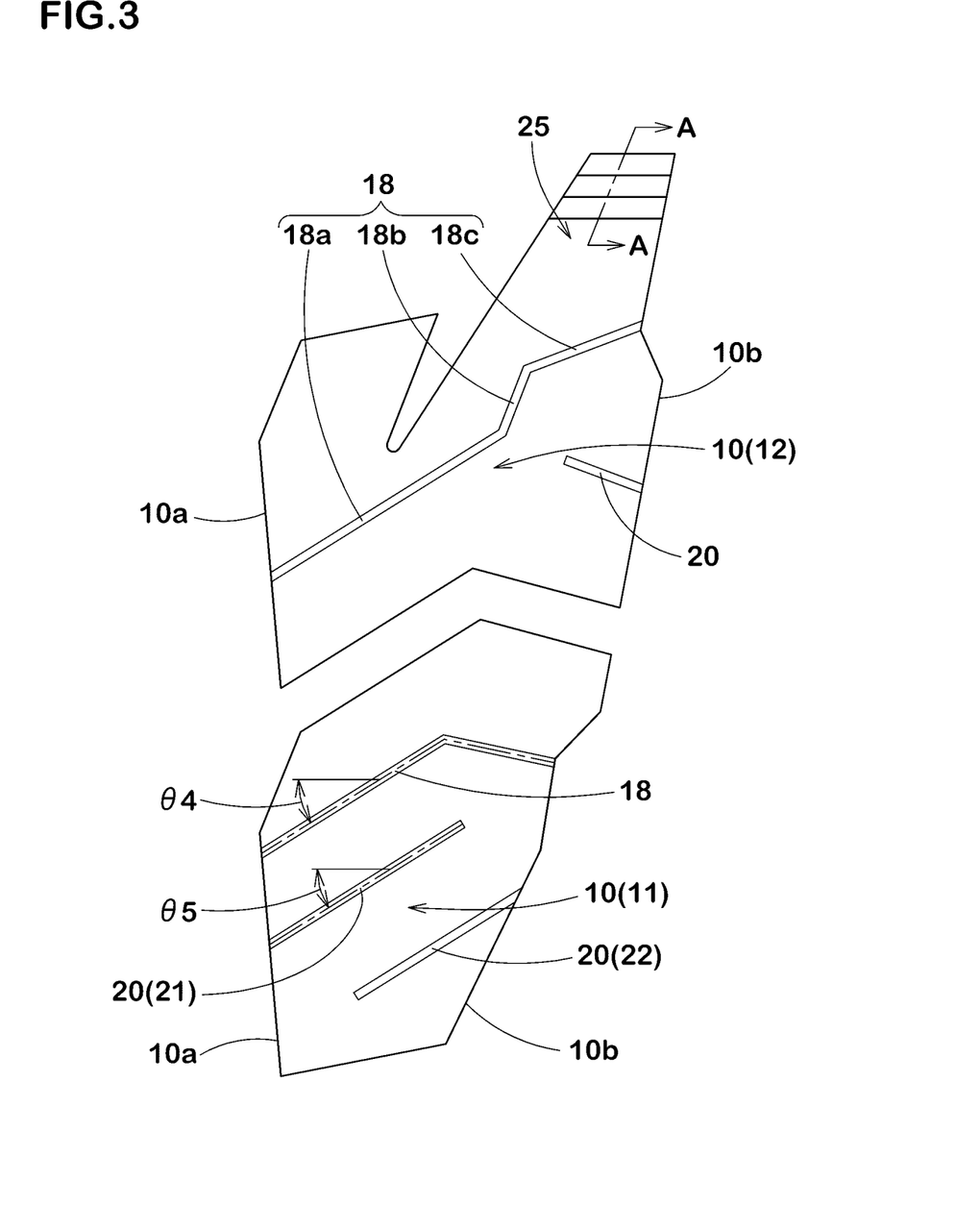
FIG. 3 is an enlarged view of middle blocks of FIG. 2.

FIG. 3 is an enlarged view of the middle blocks 10. As shown in FIG. 3, the middle blocks 10 include first middle blocks 11 each provided with one full sipe 18 and two semi-sipes 20 and second middle blocks 12 each provided with one full sipe 18 and one semi-sipe 20.

The full sipe 18 provided in each of the first middle blocks 11 has one bent portion, for example, and in this embodiment, it is bent in a direction so as to be convex toward one side in the tyre circumferential direction (upper side in FIG. 3).

It is preferred that a maximum angle θ4 of the full sipe 18 with respect to the tyre axial direction is in a range of from 25 to 35 degrees, for example. It is possible that the full sipe 18 configured as such improve on-ice/on-snow traction and cornering performance in a good balance.

The two semi-sipes 20 provided in each of the first middle blocks 11 include a first semi-sipe 21 extending from the first edge (10a) and a second semi-sipe 22 extending from the second edge (10b), for example. It is preferred that the first semi-sipe 21 and the second semi-sipe 22 are inclined in the same direction with respect to the tyre axial direction. In a more preferred embodiment, the first semi-sipe 21 and the second semi-sipe 22 extend parallel with each other. These two semi-sipes 20 configured as such are useful for suppressing the uneven wear of the block.

From the same point of view, in each of the first middle blocks 11, the first semi-sipe 21 and the second semi-sipe 22 are inclined in the same direction as a part of the full sipe 18 and they extend parallel in this embodiment.

It is preferred that a maximum angle 85 of each of the semi-sipes 20 with respect to the tyre axial direction is in a range of from 25 to 35 degrees, for example.

The full sipe 18 provided in each of the second middle blocks 12 is inclined in the same direction as the semi-sipes 20 provided in the first middle blocks 11, for example. Further, this full sipe 18 has two bent portions.

The full sipe 18 provided in each of the second middle blocks 12 includes a first sipe portion (18a), a second sipe portion (18b), and a third sipe portion (18c), for example. The first sipe portion (18a) extends from the first edge (10a) and parallel with the semi-sipes 20 provided in the first middle blocks 11, for example. The second sipe portion (18b) is connected with the first sipe portion (18a) and is inclined at a larger angle than the first sipe portion (18a) with respect to the tyre axial direction, for example. The third sipe portion (18c) extends between the second sipe portion (18b) and the second edge (10b). The third sipe portion (18c) is inclined at a smaller angle than the first sipe portion (18a) with respect to the tyre axial direction, for example.

The first sipe portion (18a) has a larger length than those of the second sipe portion (18b) and the third sipe portion (18c), for example. The first sipe portion (18a) in this embodiment extend so as to cross a center position in the tyre axial direction of the second middle block 12, for example. The second sipe portion (18b) has a smaller length than that of the third sipe portion (18c).

It is preferred that the semi-sipe 20 provided in each of the second middle blocks 12 is inclined in an opposite direction to the full sipe 18 provided in the second middle block 12, for example. This semi-sipe 20 has a length larger than that of the second sipe portion (18b) of the full sipe 18, for example. Further, this semi-sipes 20 has the length smaller than that of the third sipe portion (18c) of the full sipe 18. The semi-sipe 20 configured as such is helpful for improving excellent on-ice/on-snow performance while suppressing the uneven wear of the block.

As shown in FIG. 1, it is preferred that each of the middle lateral grooves 15 is connected with at least a part of a respective one of the second inclined portions (3b) of the shoulder main grooves 3, for example. Further, as shown in FIG. 2, the middle lateral grooves 15 include first middle lateral grooves 16 and second middle lateral grooves 17, for example. Each of the first middle lateral grooves 16 is connected with a respective one of the longitudinal groove portions (4a) of the crown main grooves 4, for example. Each of the second middle lateral grooves 17 is connected with at least a part of a respective one of the lateral groove portions (4b) of the crown main grooves 4, for example.

It is preferred that each of the first middle lateral grooves 16 is bent in a direction so as to be convex toward one side in the tyre circumferential direction, for example. Further, it is preferred that each of the first middle lateral grooves 16 include a part extending along the full sipes 18. The first middle lateral grooves 16 in this embodiment are bent in the same direction as the full sipes 18 arranged in the first middle blocks 11. In a more preferred embodiment, each of the first middle lateral grooves 16 in its entirety extends along a respective one of the full sipes 18. The first middle lateral grooves 16 can strongly compress snow and ice fragments therein while improving uneven wear resistance performance, therefore, it is possible that excellent on-ice/on-snow performance is exerted.

Each of the first middle lateral grooves 16 includes a first groove portion (16a) and a second groove portion (16b) which are inclined in opposite directions to each other, for example. The first groove portion (16a) is inclined in the same direction as the semi-sipes 20 arranged in the first middle blocks 11, for example. An angle θ6 of the first groove portion (16a) is in a range of from 25 to 40 degrees with respect to the tyre axial direction, for example. The second groove portion (16b) is arranged so as to be in parallel with a part of the full sipe 18 arranged in a respective one of the first middle blocks 11, for example. An angle θ7 of the second groove portion (16b) is in a range of from 10 to 20 degrees with respect to the tyre axial direction, for example.

It is preferred that each of the first middle lateral grooves 16 extends at a constant groove width W3, for example. It is preferred that the groove width W3 of each of the first middle lateral grooves 16 is smaller than the groove width W1 of each of the shoulder main grooves 3, for example. The first middle lateral grooves 16 configured as such decrease pumping sound while improving the uneven wear resistance performance, therefore, it is possible that noise performance is improved consequently.

Each of the second middle lateral grooves 17 includes a main body portion 23 and a branch portion 24, for example. The main body portion 23 extends between a respective one of the shoulder main grooves 3 and its adjacent one of the crown main grooves 4, for example. The branch portion 24 branches from the main body portion 23 and extends therefrom, for example.

It is preferred that the main body portion 23 includes a first portion (23a) extending from a respective one of the shoulder main grooves 3 at a constant groove width and a second portion (23b) connected with the first portion (23a) and having a groove width gradually, and preferably smoothly, increasing as it goes toward a respective one of the crown main grooves 4, for example. It is possible that the main body portion 23 configured as such exerts excellent on-ice/on-snow performance while improving the uneven wear resistance performance and the noise performance.

It is preferred that the first portion (23a) and the second portion (23b) are connected with each other such that a connection portion between them is bent so as to be convex toward a direction (downward in FIG. 2) opposite to the first middle lateral grooves 16. It is possible that the second middle lateral grooves 17 configured as such, together with the first middle lateral grooves 16, exert snow shearing force in multiple directions during running on an icy/snowy road surface.

In each of the second middle lateral grooves 17, the branch portion 24 is smoothly connected with the second portion (23b) of the main body portion 23, for example. In a more preferred embodiment, it is preferred that the branch portion 24 has an edge extending linearly and continuously with an edge of the second portion (23b) of the main body portion 23.

Each of the branch portions 24 terminates within a respective one of the second middle blocks 12, for example. It is preferred that a groove width of each of the branch portions 24 decreases gradually, and preferably smoothly, as it goes toward its terminating end within a respective one of the second middle blocks 12, for example. Further, it is preferred that, in each of the second middle lateral grooves 17, the branch portion 24 has a depth smaller than that of the main body portion 23. It is possible that the branch portions 24 configured as such provide the snow shearing force while maintaining rigidity of the second middle blocks 12.

It is preferred that, in this embodiment, a ground contacting surface of one middle land region 6 includes two or more second middle lateral grooves 17 when the tyre 1 in the standard state is loaded with the standard tyre load. Thereby, further excellent on-ice/on-snow performance can be obtained.

Each of the second middle blocks 12 in this embodiment includes a tapered block piece 25 defined by the second portion (23b) and the branch portion 24 of a respective one of the second middle lateral grooves 17 and the longitudinal groove portions (4a) and the lateral groove portions (4b) of a respective one of the crown main grooves 4. The tapered block piece 25 has a width gradually, and preferably smoothly, decreasing as it goes toward its tip. It is possible that the tapered block pieces 25 configured as such suppress clogging of snow and ice fragments in each of the grooves.

Figure 4:
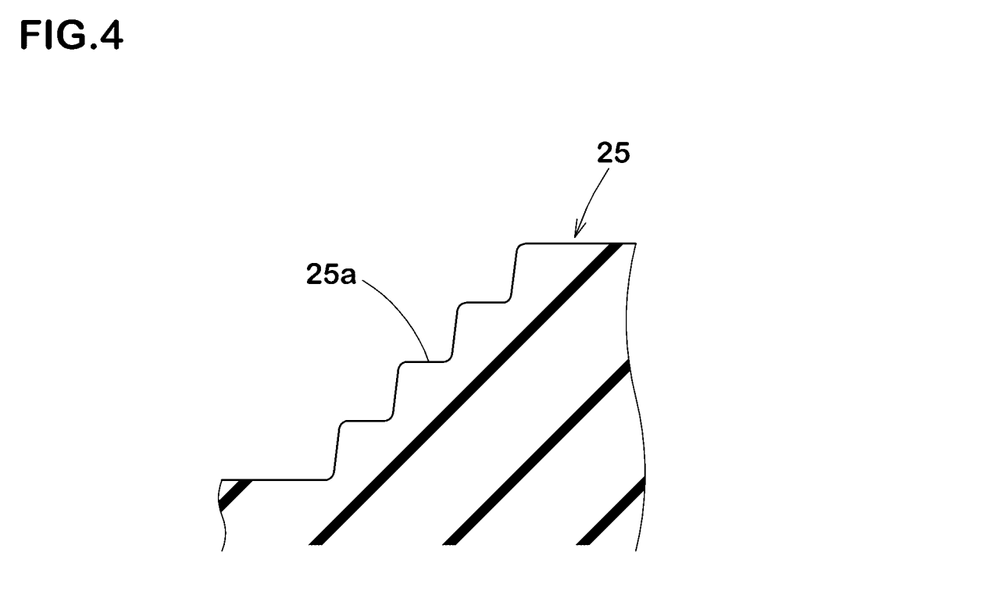
FIG. 4 is a cross-sectional view taken along A-A line of FIG. 3.

FIG. 4 is a cross-sectional view of one of the tapered block pieces 25 taken along A-A line of FIG. 3. As shown in FIG. 4, it is preferred that each of the tapered block pieces 25 has a side wall surface (25a) extending stepwise toward a groove bottom surface of its adjacent one of the lateral groove portions (4b) of a respective one of the crown main grooves 4. The tapered block pieces 25 configured as such suppress a sudden change in the rigidity of the blocks, therefore, it is possible that the heel and toe wear is effectively suppressed.

In this embodiment, in order to certainly improve the on-ice/on-snow performance, it is preferred that the ground contacting surface of one middle land region 6 includes two or more tapered block piece 25 when the tyre 1 in the standard state is loaded with the standard tyre load.

Figure 5:
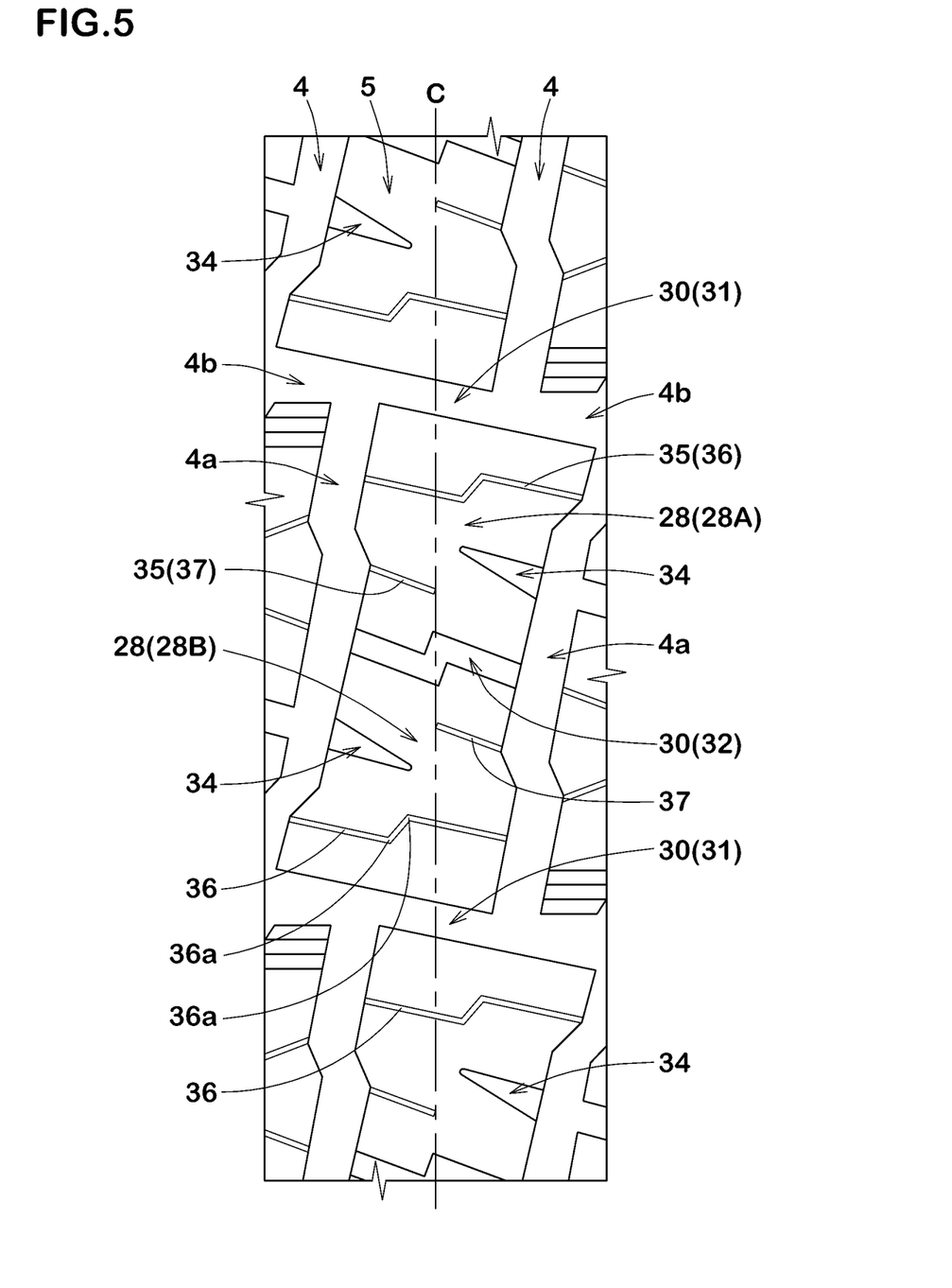
FIG. 5 is an enlarged view of a crown land region of FIG. 1.

FIG. 5 is an enlarged view of the crown land region 5. As shown in FIG. 5, the crown land region 5 includes a plurality of crown blocks 28. The crown land region 5 is divided into the crown blocks 28 by a plurality of crown lateral grooves 30 each extending so as to connect between the two crown main grooves 4.

The crown lateral grooves 30 include first crown lateral grooves 31 and second crown lateral grooves 32, for example. Each of the first crown lateral grooves 31 extends so as to connect between a respective one of the lateral groove portions (4b) of one of the crown main grooves 4 and its adjacent one of the lateral groove portions (4b) of the other one of the crown main grooves 4, for example. Each of the second crown lateral grooves 32 extends so as to connect between a respective one of the longitudinal groove portions (4a) of one of the crown main grooves 4 and its adjacent one of the longitudinal groove portions (4a) of the other one of the crown main grooves 4, for example.

It is preferred that the first crown lateral grooves 31 are inclined in the same direction as the lateral groove portions (4b), for example. Each of the first crown lateral grooves 31 in this embodiment has an edge extending linearly and continuously with a part of an edge of a respective one of the lateral groove portions (4b), for example.

It is preferred that the second crown lateral grooves 32 are connected with the longitudinal groove portions (4a) at different positions from the middle lateral grooves 15, for example. Each of the second crown lateral grooves 32 has at least one bent portion, for example. It is preferred that each of the second crown lateral grooves 32 is bent in a z-shape, for example, and it is bent in a crank shape such that each of bent portions has a bent angle of 90 degrees in this embodiment. It is possible that the second crown lateral grooves 32 configured as such decrease the pumping sound and form hard snow blocks therein, therefore, it is possible that excellent on-ice/on-snow performance is exerted.

The crown blocks 28 include first crown blocks 28A and second crown blocks 28B, for example. In each pair of the first crown block 28A and the second crown block 28B adjacent to each other in the tyre circumferential direction with one of the second crown lateral groove 32 therebetween, they are point symmetrical with respect to a point in the one of the second crown lateral groove 32 therebetween, for example. In this embodiment, the crown land region 5 is formed by a plurality of pairs of the first crown block 28A and the second crown block 28B arranged in the tyre circumferential direction.

Each of the crown blocks 28 includes a crown short groove 34 and crown sipes 35, for example.

Each of the crown short grooves 34 extends from a respective one of the longitudinal groove portions (4a) in the tyre axial direction and terminates within a respective one of the crown blocks 28, for example. It is preferred that the crown short grooves 34 are inclined in the same direction as the crown lateral grooves 30, for example. Further, each of the crown short grooves 34 in this embodiment terminates without crossing the tyre equator (C), for example. It is possible that the crown short grooves 34 configured as such improve the on-ice/on-snow performance while maintain the uneven wear resistance performance.

In order to further suppress decrease in rigidity of the blocks, it is preferred that each of the crown short grooves 34 has a groove width gradually decreasing as it goes toward its terminating end, for example.

As shown in FIG. 1, it is preferred that each of the crown short grooves 34 overlaps at least partially with an extended region of the second groove portion (16b) of a respectively adjacent one of the first middle lateral grooves 16, for example. Each of the crown short grooves 34 in this embodiment overlaps in its entire groove width with the extended region described above. Thereby, crossroads are formed each by one of the second groove portions (16b), one of the crown short grooves 34, and one of the longitudinal groove portions (4a) which are adjacent to each other. By such an arrangement of the crown short grooves 34, it is possible that hard snow blocks are formed in the crossroads, therefore, it is possible that the on-ice/on-snow performance is further improved consequently.

As shown in FIG. 5, the crown sipes 35 include full crown sipes 36 each extending so as to completely cross a respective one of the crown blocks 28 and semi-crown sipes 37 each extending from one of the crown main grooves 4 and terminating within a respective one of the crown blocks 28, for example.

The full crown sipes 36 are inclined in the same direction as the lateral groove portions (4b) of the crown main grooves 4, for example. It is preferred that each of the full crown sipes 36 has at least one bent portion, for example. Each of the full crown sipes 36 in this embodiment has two bent portions (36a) which are convex toward opposite directions to each other.

In each of the crown blocks 28, the semi-crown sipe 37, together with the crown short groove 34, is arranged on one side in the tyre circumferential direction of the full crown sipes 36, for example. In each of the crown blocks 28, the semi-crown sipe 37 is connected with one of the longitudinal groove portions (4a) adjacent thereto on a side opposite to the longitudinal groove portion (4a) with which the crown short groove 34 is connected, for example. It is preferred that the semi-crown sipes 37 are inclined in the same direction as the crown lateral grooves 30, for example.

Figure 6:
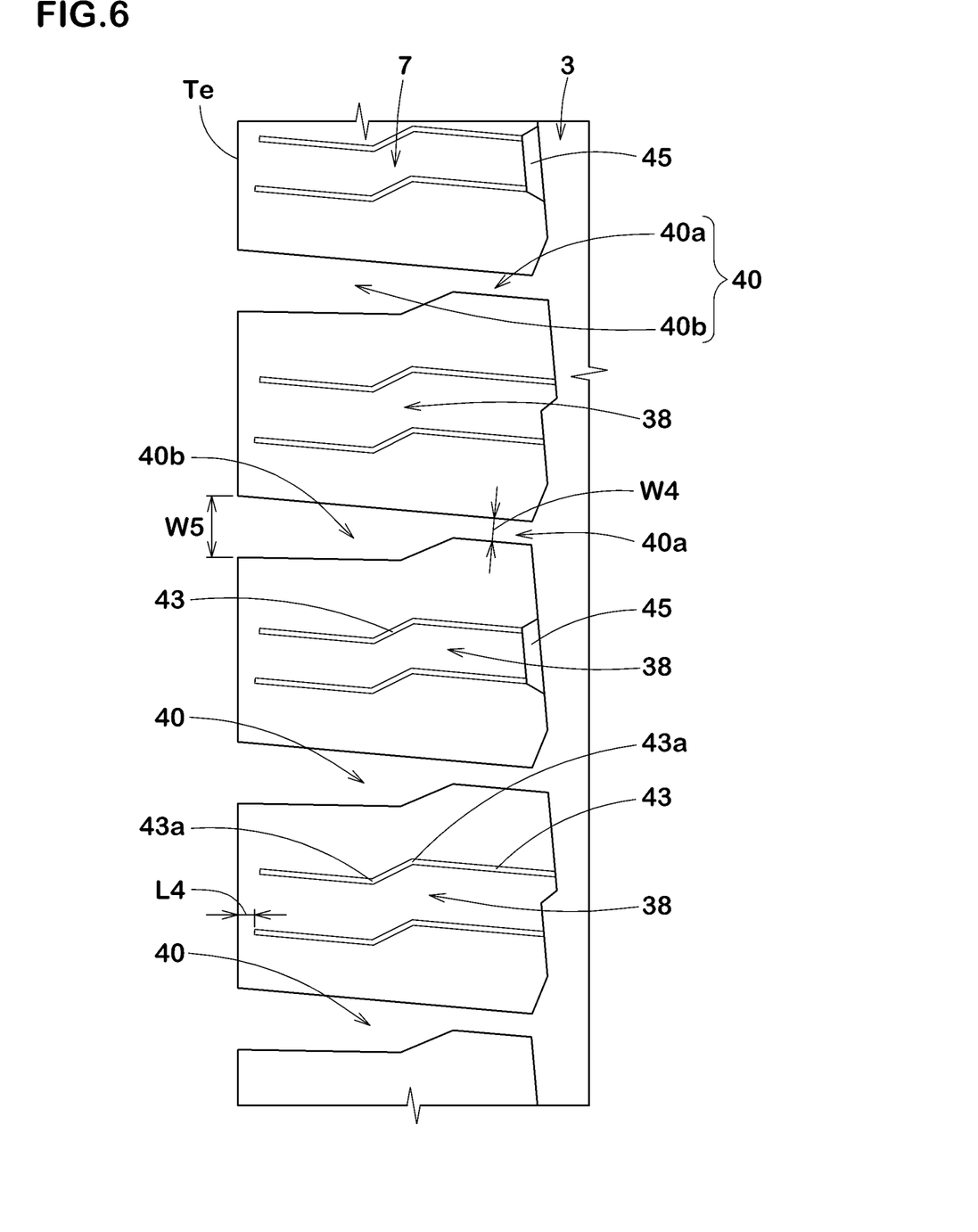
FIG. 6 is an enlarged view of a shoulder land region of FIG. 1.

FIG. 6 is an enlarged view of one of the shoulder land regions 7. As shown in FIG. 6, each of the shoulder land regions 7 includes a plurality of shoulder blocks 38. Each of the shoulder land regions 7 is divided into the shoulder blocks 38 by a plurality of shoulder lateral grooves 40 each extending between a respective one of the shoulder main grooves 3 and its adjacent one of the tread edges (Te).

As shown in FIG. 1, it is preferred that each of the shoulder lateral grooves 40 is connected with a respective one of the second inclined portions (3b) of the shoulder main grooves 3, for example. Thereby, crossroads 41 each defined by one of the second inclined portions (3b), one of the first middle lateral grooves 16, and one of the shoulder lateral grooves 40 which are adjacent to each other. Therefore, hard snow blocks are formed in the crossroads 41, thereby, excellent on-ice/on-snow performance is obtained.

It is preferred that the crossroads 41 are formed in each of the two shoulder main grooves 3. Further, it is preferred that a ground contacting surface of the tyre 1 includes six or more crossroads 41 when the tyre 1 in the standard state is loaded with the standard tyre load, for example.

It is preferred that each of the first middle lateral grooves 16 is displaced in the tyre circumferential direction from its adjacent one of the shoulder lateral grooves 40. In other words, a region obtained by extending an end portion of each of the first middle lateral grooves 16 in the tyre axial direction does not overlap with an end portion of its adjacent one of the shoulder lateral grooves 40. On the other hand, a region obtained by extending the end portion of each of the first middle lateral grooves 16 in its longitudinal direction overlaps with the end portion of its adjacent one of the shoulder lateral grooves 40. A distance L3 in the tyre circumferential direction between the end portion of each of the first middle lateral grooves 16 and the end portion of its adjacent one of the shoulder lateral grooves 40 is in a range of from 0.80 to 1.20 times the maximum groove width W1 of each of the shoulder main grooves 3, for example.

As shown in FIG. 6, each of the shoulder lateral grooves 40 includes a first shoulder lateral groove portion (40a) and a second shoulder lateral groove portion (40b), for example. The first shoulder lateral groove portion (40a) extends at a constant groove width from one of the shoulder main grooves 3 toward its adjacent one of the tread edges (Te), for example. The second shoulder lateral groove portion (40b) is connected with the first shoulder lateral groove portion (40a) on a side of the adjacent one of the tread edges (Te) and has a groove width gradually increasing as it goes toward the adjacent one of the tread edges (Te). In the shoulder lateral grooves 40 configured as such, snow clogging is less likely to occur, therefore, it is possible that excellent on-ice/on-snow performance is continuously exerted.

The first shoulder lateral groove portion (40a) has a groove width smaller than those of each of the shoulder main grooves 3 and each of the first middle lateral grooves 16, for example. A groove width W4 of the first shoulder lateral groove portion (40a) is in a range of from 0.30 to 0.50 times the maximum groove width W1 of each of the shoulder main grooves 3, for example.

It is preferred that a maximum width W5 of the second shoulder lateral groove portion (40b) is in a range of from 2.0 to 3.5 times the groove width W4 of the first shoulder lateral groove portion (40a), for example. Further, it is preferred that the second shoulder lateral groove portion (40b) has a length in the tyre axial direction larger than that of the first shoulder lateral groove portion (40a), for example. In a further preferred embodiment, the second shoulder lateral groove portion (40b) has an edge extending linearly and continuously with an edge of the first shoulder lateral groove portion (40a), for example. The second shoulder lateral groove portions (40b) configured as such are helpful for improving the uneven wear resistance performance.

It is preferred that each of the shoulder blocks 38 is provided with a plurality of shoulder sipes 43. Each of the shoulder sipes 43 extends from a respective one of the first inclined portions (3a) of the shoulder main grooves 3 toward its adjacent one of the tread edges (Te) and terminates within a respective one of the shoulder blocks 38, for example. It is preferred that a distance L4 between an end of each of the shoulder sipes 43 and its adjacent one of the tread edges (Te) is smaller than the groove width W1 of each of the shoulder main grooves 3, for example. It is possible that the shoulder sipes 43 configured as such suppress the uneven wear in the vicinity of the tread edges (Te) while securing a sufficient length of each of the shoulder sipes 43.

The shoulder sipes 43 extend along the shoulder lateral grooves 40, for example. It is preferred that each of the shoulder sipes 43 as a whole is inclined in a direction opposite to each of the semi-sipes 20 provided in the first middle blocks 11 with respect to the tyre axial direction, for example.

It is preferred that each of the shoulder sipes 43 has at least one bent portion. Each of the shoulder sipes 43 in this embodiment has two bent portions (43*a*) which are convex toward opposite directions to each other. The shoulder sipes 43 configured as such suppress the shearing deformation of the shoulder blocks 38 in a longitudinal direction of the shoulder sipes 43, therefore, it is possible that the uneven wear of the shoulder blocks 38 is suppressed.

It is preferred that at least one of the shoulder blocks 38 in this embodiment has a chamfered portion 45 having an inclined surface extending between a ground contacting surface and a side wall of the at least one of the shoulder blocks 38. It is possible that the chamfered portion 45 increases volume of snow blocks formed by the shoulder main grooves 3 while suppressing the uneven wear of the shoulder blocks 38.

While detailed description has been made of an embodiment of the present invention, the present invention can be embodied in various forms without being limited to the illustrated embodiment.

Working Examples (Examples)

Figure 7:
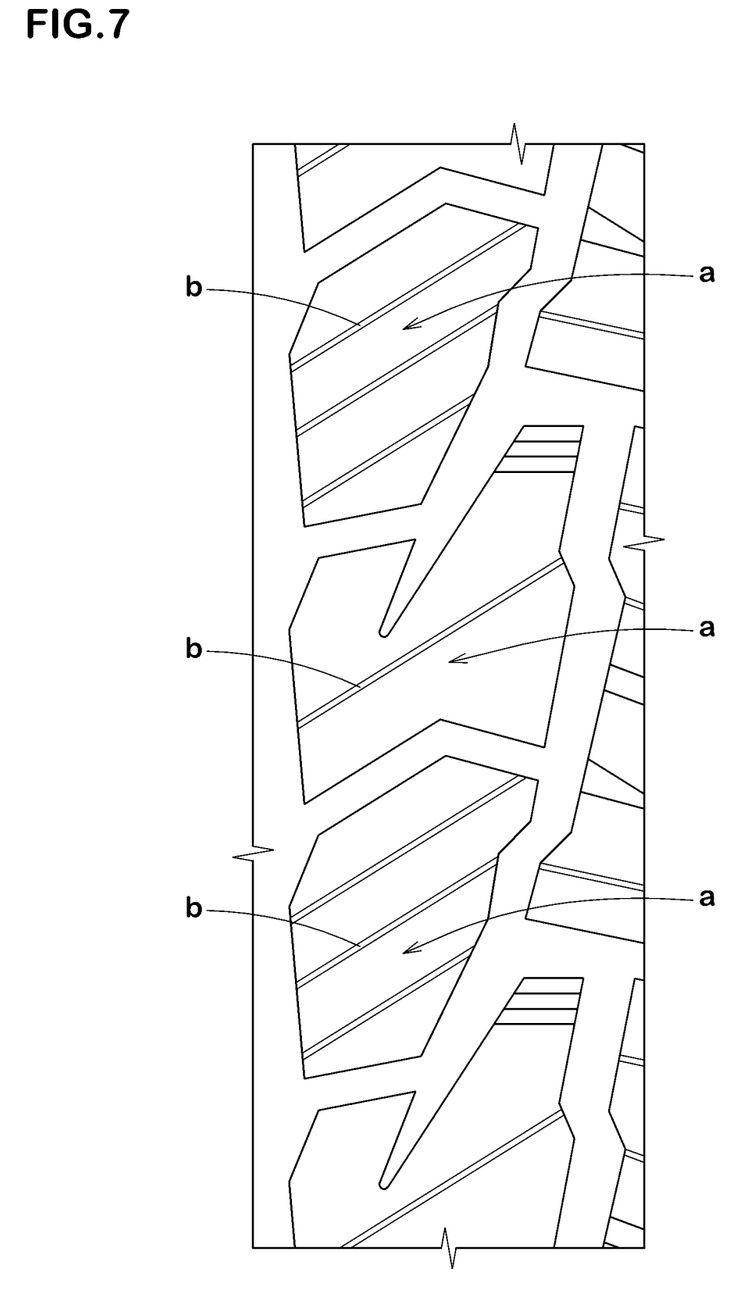
FIG. 7 is an enlarged view of the middle land region of Reference.

Tyres of size 225/65R17 having the basic pattern shown in FIG. 1 were made by way of test according to the specifications listed in Table 1. As Reference, as shown in FIG. 7, tyres in which each of middle blocks (a) was provided with only sipes (b) each extending linearly so as to completely cross a respective one of the blocks was made by way of test. The tyres as the Reference had substantially the same tread pattern as that shown in FIG. 1 except for the configuration of the middle land regions. Each of the test tyres was tested for the on-ice/on-snow performance and the uneven wear resistance performance. Common specifications of the test tyres and the test methods were as follows.

Tyre rim: 17×7.03

Tyre inner pressure: 220 kPa

Test vehicle: 4WD-car with displacement of 2000 cc

Tyre mounting position: all wheels

<On-Ice/On-Snow Performance>

The performance was evaluated by the driver's feeling while the driver drove the test vehicle on an icy/snowy road surface. The results are indicated by an evaluation point based on the Reference being 100, wherein the larger the numerical value, the better the on-ice/on-snow performance is.

<Uneven Wear Resistance Performance>

Wear energy of each of the middle land regions was measured by using a wear energy measuring device. The test results are indicated by an index based on the wear energy of the Reference being 100, wherein the smaller the numerical value, the smaller the wear energy is, which shows more excellent uneven wear resistance performance.

The test results are shown in Table 1.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing Middle land region | FIG. 7 | FIG. 2 | FIG. 2 | FIG. 2 | FIG. 2 | FIG. 2 | FIG. 2 | FIG. 2 | FIG. 2 | FIG. 2 |
| Angle θ4 of Full sipe [degree] | — | 30 | 25 | 28 | 32 | 35 | 30 | 30 | 30 | 30 |
| Angle θ5 of Semi-sipe [degree] | — | 30 | 30 | 30 | 30 | 30 | 25 | 28 | 32 | 35 |
| on-ice/on-snow performance [index] | 100 | 105 | 103 | 105 | 105 | 106 | 104 | 105 | 105 | 105 |
| Uneven wear resistance performance [index] | 100 | 96 | 96 | 96 | 97 | 99 | 95 | 96 | 96 | 98 |

From the test results, it was confirmed that the tyres as Examples exerted excellent on-ice/on-snow performance while suppressing the uneven wear as compared with the tyres as the Reference.

The invention claimed is:

1. A tyre comprising a tread portion comprising a shoulder main groove extending continuously in a zigzag manner in a tyre circumferential direction on a side of a tread edge, a plurality of middle lateral grooves each extending inwardly in a tyre axial direction from the shoulder main groove, and a plurality of middle blocks divided by the plurality of the middle lateral grooves, wherein each of the middle blocks has a ground contacting surface defined between a first edge thereof extending in the tyre circumferential direction and a second edge thereof extending in the tyre circumferential direction, at least one of the middle blocks has a full sipe and at least one semi-sipe, the full sipe extends so as to connect between the first edge and the second edge and has at least one bent portion, the semi-sipe extends linearly from the first edge or the second edge and terminates within the at least one of the middle blocks, the tread portion has a crown main groove extending in the tyre circumferential direction on a side of a tyre equator of the shoulder main groove, the crown main groove has longitudinal groove portions and lateral groove portions arranged alternately in the tyre circumferential direction so that the crown main groove extends in a zigzag manner, the longitudinal groove portions extend obliquely in the tyre circumferential direction, the lateral groove portions extend in the tyre axial direction, the middle lateral grooves include a first middle lateral groove and a second middle lateral groove, the first middle lateral groove is connected with one of the longitudinal groove portions, the second middle lateral groove is connected with at least a part of one of the lateral groove portions, the second middle lateral groove includes a main body portion and a branch portion, the main body portion extends so as to connect between the shoulder main groove and the crown main groove, the branch portion branches from the main body portion and extends therefrom, the full sipe has a single bent portion so as to be bent in a V-shape or only two bent portions so as to be bent in a crank shape to form a plurality of linear segments, and a length of the branch portion in a longitudinal direction thereof is larger than a length of the shortest linear segment in a longitudinal direction thereof among the linear segments of the full sipe.

2. The tyre according to claim 1, wherein the at least one of the middle blocks has two semi-sipes.

3. The tyre according to claim 2, wherein the two semi-sipes include a first semi-sipe extending from the first edge and a second semi-sipe extending from the second edge.

4. The tyre according to claim 1, wherein the first middle lateral groove is bent in a direction so as to be convex toward one side in the tyre circumferential direction.

5. The tyre according to claim 4, wherein the first middle lateral groove includes a part extending along the full sipe.

6. The tyre according to claim 1, wherein
the main body portion includes a first portion and a second portion,
the first portion extends from the shoulder main groove at a constant groove width, and
the second portion is connected with the first portion and has a groove width gradually increasing as it goes toward the crown main groove.

7. The tyre according to claim 6, wherein
the first middle lateral groove is bent in a direction so as to be convex toward one side in the tyre circumferential direction, and
the first portion and the second portion are connected with each other such that a connection portion between them is bent so as to be convex toward the other side in the tyre circumferential direction.

8. The tyre according to claim 1, wherein the branch portion terminates within one of the middle blocks adjacent thereto.

9. The tyre according to claim 1, wherein the branch portion has an edge extending linearly and continuously with a part of an edge of the main body portion.

10. The tyre according to claim 3, wherein the middle blocks include first middle blocks each provided with one full sipe and the first semi-sipe and the second semi-sipe and second middle blocks each provided with one full sipe and one semi-sipe.

11. The tyre according to claim 10, wherein the full sipe provided in each of the first middle blocks has one bent portion so as to be convex toward one side in the tyre circumferential direction.

12. The tyre according to claim 11, wherein a maximum angle of the full sipe provided in each of the first middle blocks with respect to the tyre axial direction is in a range of from 25 to 35 degrees.

13. The tyre according to claim 10, wherein
the first semi-sipe and the second semi-sipe are inclined in the same direction with respect to the tyre axial direction, and
the first semi-sipe and the second semi-sipe extend parallel with each other.

14. The tyre according to claim 13, wherein a maximum angle θ5 of each of the semi-sipes with respect to the tyre axial direction is in a range of from 25 to 35 degrees.

15. The tyre according to claim 10, wherein the full sipe provided in each of the second middle blocks is inclined in the same direction as the semi-sipes provided in the first middle blocks.

16. The tyre according to claim 10, wherein
the full sipe provided in each of the second middle blocks has two bent portions so as to include a first sipe portion, a second sipe portion, and a third sipe portion,
the first sipe portion extends from the first edge and parallel with the semi-sipes provided in the first middle blocks,
the second sipe portion is connected with the first sipe portion and is inclined at a larger angle than the first sipe portion with respect to the tyre axial direction, and
the third sipe portion extends between the second sipe portion and the second edge and is inclined at a smaller angle than the first sipe portion with respect to the tyre axial direction.

17. The tyre according to claim 1, wherein
the first middle lateral groove has a single bent portion so as to be bent in a V-shape convex toward one side in the tyre circumferential direction,
the main body portion has a single bent portion so as to be bent in a V-shape convex toward the other side in the tyre circumferential direction to form two linear segments on both sides of the bent portion, and
the two linear segments of the main body portion and the branch portion are inclined to the same side with respect to the tyre axial direction.

18. A tyre comprising a tread portion comprising a shoulder main groove extending continuously in a zigzag manner in a tyre circumferential direction on a side of a tread edge, a plurality of middle lateral grooves each extending inwardly in a tyre axial direction from the shoulder main groove, and a plurality of middle blocks divided by the plurality of the middle lateral grooves,
wherein
each of the middle blocks has a ground contacting surface defined between a first edge thereof extending in the tyre circumferential direction and a second edge thereof extending in the tyre circumferential direction,
at least one of the middle blocks has a full sipe and at least one semi-sipe,
the full sipe extends so as to connect between the first edge and the second edge and has at least one bent portion,
the semi-sipe extends linearly from the first edge or the second edge and terminates within the at least one of the middle blocks,
the tread portion has a crown main groove extending in the tyre circumferential direction on a side of a tyre equator of the shoulder main groove,
the crown main groove has longitudinal groove portions and lateral groove portions arranged alternately in the tyre circumferential direction so that the crown main groove extends in a zigzag manner,
the longitudinal groove portions extend obliquely in the tyre circumferential direction,
the lateral groove portions extend in the tyre axial direction,
the middle lateral grooves include a first middle lateral groove and a second middle lateral groove,
the first middle lateral groove is connected with one of the longitudinal groove portions,
the second middle lateral groove is connected with at least a part of one of the lateral groove portions,
the second middle lateral groove includes a main body portion and a branch portion,
the main body portion extends so as to connect between the shoulder main groove and the crown main groove, the branch portion branches from the main body portion and extends therefrom, and in the middle block arranged immediately adjacent to the second middle lateral groove on the branch portion side, a portion of the middle block on the crown main groove side of the branch portion protrudes more toward an opposite side to the branch portion in the tyre circumferential direction than a portion of the middle block on the shoulder main groove side of the branch portion.

19. The tyre according to claim 18, wherein the first middle lateral groove has a single bent portion so as to be bent in a V-shape convex toward one side in the tyre circumferential direction, the main body portion has a single bent portion so as to be bent in a V-shape convex toward the other side in the tyre circumferential direction to form two linear segments on both sides of the bent portion, and the two linear segments of the main body portion and the branch portion are inclined to the same side with respect to the tyre axial direction.

20. The tyre according to claim 18, wherein the at least one of the middle blocks has two semi-sipes, the two semi-sipes include a first semi-sipe extending from the first edge and a second semi-sipe extending from the second edge, and the middle blocks include first middle blocks each provided with one full sipe and the first semi-sipe and the second semi-sipe and second middle blocks each provided with one full sipe and one semi-sipe.

* * * * *